US012098602B2

(12) United States Patent
McIntyre (10) Patent No.: US 12,098,602 B2
(45) Date of Patent: Sep. 24, 2024

(54) SYSTEM AND METHOD FOR REMOVING DRILLING FLUID FROM DRILL CUTTINGS USING DIRECT HEAT

(71) Applicant: Elavo CleanTech Ltd., Calgary (CA)

(72) Inventor: Barry McIntyre, Calgary (CA)

(73) Assignee: ELAVO CLEANTECH LTD., Calgary (CA)

( * ) Notice: Subject to any disclaimer, the term of this patent is extended or adjusted under 35 U.S.C. 154(b) by 0 days.

(21) Appl. No.: 17/755,358

(22) PCT Filed: Nov. 18, 2020

(86) PCT No.: PCT/CA2020/051566
§ 371 (c)(1),
(2) Date: Apr. 27, 2022

(87) PCT Pub. No.: WO2021/097563
PCT Pub. Date: May 27, 2021

(65) Prior Publication Data
US 2022/0381096 A1    Dec. 1, 2022

Related U.S. Application Data

(60) Provisional application No. 62/939,374, filed on Nov. 22, 2019.

(51) Int. Cl.
*E21B 21/06* (2006.01)
*B09B 3/40* (2022.01)
(52) U.S. Cl.
CPC .............. *E21B 21/066* (2013.01); *B09B 3/40* (2022.01); *E21B 2200/22* (2020.05)
(58) Field of Classification Search
None
See application file for complete search history.

(56) References Cited

U.S. PATENT DOCUMENTS 3,232,885 A    2/1966 Henke
3,241,248 A    3/1966 Gerlach et al.
(Continued)

FOREIGN PATENT DOCUMENTS

CN          109538139 A    3/2019
EP            1153197 B1    4/2004
WO    WO-2014/171839 A1    10/2014

OTHER PUBLICATIONS

Communication Pursuant to Article 94 (3) EPC for European Patent Application No. 20889537.5, dated Nov. 28, 2023, (8 pages), European Patent Office, Netherlands.
(Continued)

*Primary Examiner* — Charles R Nold
(74) *Attorney, Agent, or Firm* — Alston & Bird LLP (57) ABSTRACT

Methods and systems for removing drilling fluid from wet drill cuttings are described. The methods may comprise: at a pressure above atmospheric pressure: separating air into constituent nitrogen and oxygen gases; heating a first mixture comprising the constituent oxygen gas with a mixture of air and natural gas to a combustion temperature, to produce a first combustion exhaust; transferring heat from the first combustion exhaust to a second mixture comprising the constituent nitrogen gas and non-condensable inert gas, thereby heating the second mixture to a first temperature; providing the heated second mixture to the wet drill cuttings to contact and directly heat the wet drill cuttings by convection so that at least a portion of drilling fluid is evaporated therefrom and at least some dry solid drill cuttings remain; condensing the evaporated drilling fluid to produce condensed drilling fluid; and separately recovering condensed drilling fluid and dry solid drill cuttings.

20 Claims, 6 Drawing Sheets

(56) References Cited

U.S. PATENT DOCUMENTS

| | | | |
|---|---|---|---|
| 3,538,614 | A | 11/1970 | Weimer et al. |
| 4,139,462 | A | 2/1979 | Sample, Jr. |
| 4,208,285 | A | 6/1980 | Sample, Jr. |
| 4,222,988 | A | 9/1980 | Barthel |
| 4,304,609 | A | 12/1981 | Morris |
| 4,387,514 | A | 6/1983 | McCaskill, Jr. |
| 4,725,362 | A | 2/1988 | Dugat |
| 5,090,498 | A | 2/1992 | Hamill |
| 5,882,381 | A | 3/1999 | Hauck et al. |
| 5,883,481 | A | 3/1999 | Hauck et al. |
| 6,530,438 | B1 | 3/2003 | McIntyre |
| 6,695,077 | B2 * | 2/2004 | Szymocha ............... B09B 3/40 134/25.1 |
| 6,722,436 | B2 | 4/2004 | Krill |
| 7,306,057 | B2 | 12/2007 | Strong et al. |
| 7,337,860 | B2 | 3/2008 | McIntyre |
| 8,074,738 | B2 | 12/2011 | McDonald et al. |
| 8,158,000 | B2 | 4/2012 | Newman et al. |
| 8,356,678 | B2 | 1/2013 | Perez-Cordova |
| 8,607,894 | B2 | 12/2013 | McDonald et al. |
| 8,641,895 | B2 | 2/2014 | Perez-Cordova |
| 8,728,281 | B2 | 5/2014 | Browne et al. |
| 8,820,438 | B2 | 9/2014 | Ross et al. |
| 9,073,104 | B2 | 7/2015 | Burnett et al. |
| 9,334,449 | B2 | 5/2016 | Perez-Cordova |
| 9,364,877 | B2 | 6/2016 | Brady |
| 9,370,809 | B2 | 6/2016 | Brady et al. |
| 9,393,603 | B2 | 7/2016 | Brady |
| 9,636,723 | B2 | 5/2017 | Brady |
| 9,732,673 | B2 | 8/2017 | Denton et al. |
| 9,884,997 | B2 | 2/2018 | Podlipskiy |
| 9,939,197 | B2 | 4/2018 | Hoffman |
| 2003/0136747 | A1 | 7/2003 | Wood |
| 2003/0155158 | A1 | 8/2003 | Szymocha et al. |
| 2005/0153844 | A1 | 7/2005 | McIntyre |
| 2005/0247599 | A1 | 11/2005 | Browne et al. |
| 2005/0260111 | A1 | 11/2005 | Arrison et al. |
| 2010/0038143 | A1 | 2/2010 | Burnett et al. |
| 2012/0073932 | A1 | 3/2012 | Burnett et al. |
| 2015/0153102 | A1 | 6/2015 | Burnett et al. |
| 2015/0300108 | A1 | 10/2015 | Ahuja et al. |
| 2015/0315454 | A1 | 11/2015 | Perez-Cordova |
| 2016/0326020 | A1 | 11/2016 | Kubala et al. |
| 2022/0389777 | A1 | 12/2022 | McIntyre |
| 2022/0389778 | A1 | 12/2022 | McIntyre |

OTHER PUBLICATIONS

Supplementary European Search Report for European Application No. 20889702.5, dated Dec. 19, 2023, (13 pages), European Patent Office, Munich, Germany.

Communication Pursuant to Article 94 (3) EPC for European Patent Application No. 20889703.3, dated Nov. 28, 2023, (7 pages), European Patent Office, Netherlands.

International Search Report and Written Opinion for International Application No. PCT/CA2020/051567, dated Jan. 18, 2021, (11 pages), Canadian Intellectual Property Office, Quebec, Canada.

International Search Report and Written Opinion for International Application No. PCT/CA2020/051568, dated Feb. 3, 2021, (12 pages), Canadian Intellectual Property Office, Quebec, Canada.

Extended European Search Report for European Patent Application No. 20889537.5, dated Feb. 15, 2023, (8 pages), European Patent Office, Munich, Germany.

Extended European Search Report for European Patent Application No. 20889703.3, dated Feb. 15, 2023, (8 pages), European Patent Office, Munich, Germany.

International Search Report and Written Opinion for International Application No. PCT/CA2020/051566, dated Feb. 5, 2021, (12 pages), Canadian Intellectual Property Office, Quebec, Canada.

Communication Pursuant to Rule 164(1) EPC for European Patent Application No. 20889702.5, dated Oct. 9, 2023, (16 pages), European Patent Office, Munich, Germany.

* cited by examiner

SYSTEM AND METHOD FOR REMOVING DRILLING FLUID FROM DRILL CUTTINGS USING DIRECT HEAT

CROSS-REFERENCE TO RELATED APPLICATIONS

The present application claims priority from U.S. Provisional Patent Application No. 62/939,374 filed on Nov. 22, 2019, the contents of which are incorporated herein by reference.

FIELD

The specification relates generally to the removal of drilling fluid from wet drill cuttings generated in the drilling of oil and gas wells, and the like, and specifically to methods and systems to remove drilling fluid from wet drill cuttings using thermal techniques.

BACKGROUND

Drilling for oil and gas produces drill cuttings which are brought to ground surface in the circulating drilling fluid. The drill cuttings may be substantially separated from the drilling fluid using various combinations of shale shakers, centrifuges and mud tanks. However, some liquid or moisture remains associated with the solid "cuttings" as a surface layer and, in some cases, internally thereof. In cases where the drilling fluid is hydrocarbon-based, the cuttings usually are associated with oil, water and drilling fluid chemical additives.

Disposal of the wet cuttings is often problematic, as the associated liquids are of environmental concern. These liquids also present problems in handling and treatment. There is a well-known propensity of these cuttings to cake or form unwanted agglomerations when heated and due to mechanical handling and transport operations. This tendency is affected by the amount of liquid present and the nature of the solids and liquids, which can be quite variable.

Current methods for disposing of cuttings contaminated with drilling fluid include: hauling the cuttings to a land fill and burying them; composting; bio-remediation; thermal desorption; and combustion. The current methods focus on how to clean up the mess once drilling is terminated, rather than on how to prevent its occurrence in the first place. With most currently used methods, little, if any, of the liquids are recovered, resulting in a loss of drilling fluid. The lost fluid results in increased costs to the drilling operator, including increased disposal costs.

Thermal desorption processes are appealing for use in cleaning up cuttings associated with hydrocarbon-based drilling fluids because they can theoretically achieve a zero-residual hydrocarbon level. The thermal desorption processes currently used focus on removal of the liquids after drilling is terminated, and usually involve indirect heat. It is commonly believed that using indirect heat to dry the cuttings will reduce the risk of an uncontrolled exothermic reaction between the heated air and the drilling fluids, and that direct heating would require using a heating gas supply that does not support combustion (i.e., a non-combustible heating gas supply). As a result, in processes that use direct heat, friction, rather than heated air, is typically used to generate heat for drying the cuttings (e.g., via hammermill). In addition, current processes that use direct heat are not intended to recover drilling fluid since they usually involve direct heat in conjunction with combustion of the produced drilling fluid vapour.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Herein described are systems and methods for removing drilling fluid from wet drill cuttings. The systems and methods provide practical and efficient means for the drying of drill cuttings generated in the drilling of oil and gas. The wet drill cuttings are directly heated using a low oxygen, generally inert gas mixture at a temperature such that at least a portion of the drilling fluid is evaporated therefrom and at least some solid, dry drill cuttings remaining. The low oxygen, generally inert gas is a mixture of non-condensable inert gases and nitrogen. The nitrogen gas is provided, at least in part, by a nitrogen generator. The non-condensable inert gas may be recycled from outputs from the oil and gas drilling process and/or outputs of system components described herein.

Utilizing a low oxygen, generally inert gas mixture helps reduce the potential for unwanted reactions, including uncontrolled, exothermic reactions. This gas mixture is provided to the wet drilling cuttings so as to contact and directly heat them and is also referred to herein as the "process gas". The low oxygen content of the process gas usually allows the process gas to be provided to the wet drill cuttings at higher temperatures with a lower explosion risk of the drilling fluid than many known systems, particularly known systems that utilize a lean drying gas. The hotter combustion process usually requires less excess oxygen and does not usually increase the carbon monoxide content of the heating gas. In addition, the described methods are performed at a pressure above atmospheric pressure, rather than in a vacuum, to help prevent air from entering the system (which may introduce excess oxygen). According to some embodiments, the drying of the drill cuttings is continuous. According to some embodiments, the drying of the drill cuttings is performed as a batch process.

In terms of process efficiency, it has been found that lower oxygen levels usually result in less inert gas being heated as there will be less excess nitrogen. Generally, lower excess oxygen levels tend to result in less heat being absorbed by the heating of extra inert nitrogen which, in turn, tends to result in a higher combustion exhaust temperature. This helps achieve a higher process gas temperature, which can improve heat transfer and help minimize the overall process gas flow, subsequently reducing solids entrainment and carryover.

The described systems and methods also provide for the recovery of drilling fluids and dried solid drill cuttings. At least a portion of the evaporated drilling fluid may be condensed such that condensed drilling fluid can be separately recovered from dried solid drill cuttings.

As described further below, the described systems and methods may further comprise additional means to measure and fine tune the oxygen, nitrogen and/or carbon monoxide levels of the gas flow at various stages of the processes.

For the purposes of this application, "wet drill cuttings" include rock and biomass particles, and drilling fluid retrieved from a well drilling operation. The exact composition of the wet drill cuttings will vary from one operation to another and during an operation due to changing rock/biomass composition and drilling fluid composition. However, the wet drill cuttings can comprise, without limitation, hydrocarbons, water, shales, clays, sandstone, carbonates, drilling fluids and combinations thereof.

The terms "rich" and "lean" are also used herein. For clarity, "rich" and "lean" is used herein to denote the level of oxygen in an air-fuel mixture. A "rich air-fuel mixture" or "rich exhaust" is an air-fuel mixture having lower oxygen levels below stoichiometric. In contrast, a "lean air-fuel mixture" or "lean exhaust" is an air-fuel mixture having an excess of oxygen (oxygen level above stoichiometric). As would then be understood, "rich combustion" denotes combustion of a rich air-fuel mixture and "lean combustion" denotes combustion of a lean air-fuel mixture.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, method blocks, components, parts of components, and the like described herein in the singular are to be interpreted as also including a description of such systems, method steps or tasks, components, parts of components, and the like in the plural, and vice versa.

Figure 1A:
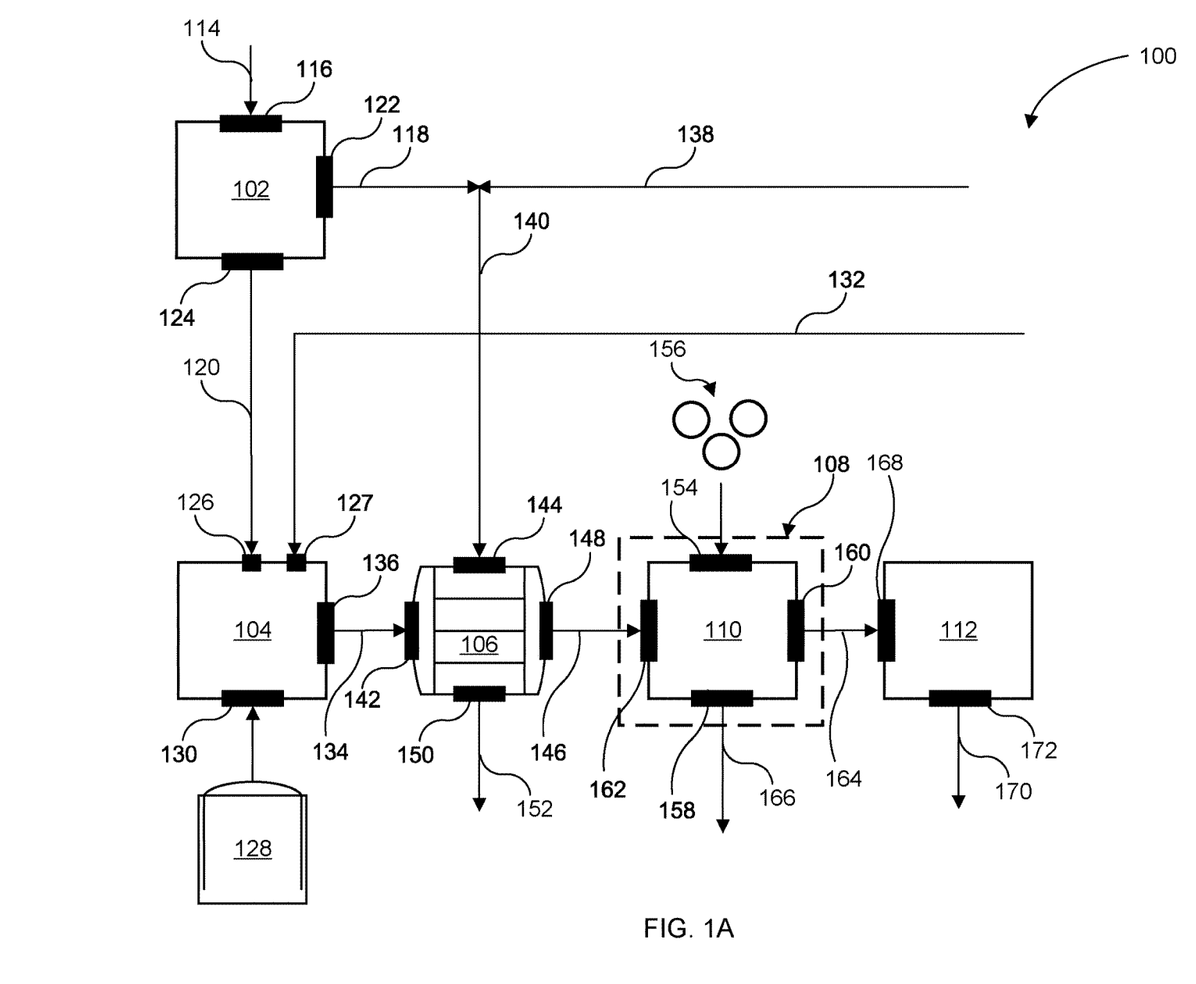
FIG. 1A depicts a system for removing drilling fluid from wet drill cuttings, according to a first set of non-limiting embodiments.

Attention is directed to FIG. 1A, which depicts an example system 100 for removing drilling fluid from wet drill cuttings, according to non-limiting embodiments. System 100 operates at a pressure above atmospheric pressure, which helps prevent air from the surrounding environment from entering the system (air which will usually contain excess oxygen). System 100 comprises a nitrogen generator 102, combustion chamber 104, a heat transfer device 106, a processor 108 having a processing chamber 110 and at least one condensing device 112.

Nitrogen generator 102 is configured to receive air, such as air 114, via at least one air inlet 116, and to separate the received air 114 into constituent nitrogen and oxygen gases, such as nitrogen gas 118 and oxygen gas 120. The nitrogen generator 102 comprises at least one nitrogen outlet 122 and at least one oxygen outlet 124. Any suitable nitrogen generating device, or combination of devices, is contemplated. For example, according to some embodiments, the nitrogen generator may be a membrane or pressure swing adsorption (PSA) type, of sufficient size to provide a make-up stream of nitrogen to offset any process losses, with the bulk of the inert process gas stream being recycled non-condensable process gases. Any available source of ostensibly inert gas may be utilized.

The combustion chamber 104 is configured to heat a first mixture comprising the constituent oxygen gas 120, air, such as combustion air 132, and a hydrocarbon-based fuel to a combustion temperature, $T_C$, thereby producing a first combustion exhaust 134. The combustion chamber 104 comprises one or more burners to heat the first mixture. For example, according to some embodiments, the combustion chamber 104 comprises at least one high efficiency, low excess oxygen burner. The constituent oxygen gas 120 is provided, directly or indirectly, to the combustion chamber 104 via at least one oxygen inlet 126. The air is provided, directly or indirectly, to the combustion chamber 104 via at least one air inlet 127 and the hydrocarbon-based fuel is provided to the combustion chamber 104, directly or indirectly, via at least one fuel inlet 130. The hydrocarbon-based fuel is provided from any suitable fuel source, such as natural gas fuel source 128 or flue gas. The combustion air 132 may be supplied in any suitable manner, such as by a centrifugal or positive displacement blower (not shown). The first combustion exhaust 134 is provided from the combustion chamber 104 via at least one combustion exhaust outlet, such as exhaust outlet 136.

The constituent nitrogen gas 118 is mixed with non-condensable inert gas 138 to create a second mixture 140. The non-condensable inert gas is preferably recycled non-condensable gas residual from condensing process vapors out of the process gas stream but could be from any other reliable source such as engine exhaust if available in suitable quantities.

The first combustion exhaust 134 and the second mixture 140 are provided to the heat transfer device 106, directly or indirectly, via inlets 142 and 144, respectively. The heat transfer device 106 is configured to heat the second mixture 140 to a first temperature, $T_1$, by transferring heat from the first combustion exhaust 134 to the second mixture 140. The heat transfer device 106 comprises any device or combination of devices suitable for transferring heat from the first combustion exhaust 134 to the second air-fuel mixture 140. For example, according to some embodiments, the heat transfer device 106 is a heat exchanger. The heated second mixture 146 exits the heat transfer device 106 via at least one outlet, such as outlet 148, for receipt by the processing chamber 110. After at least a portion of the heat has been transferred therefrom, the cooler, first combustion exhaust is released from the heat transfer device 106 via at least one outlet, such as outlet 150. According to some embodiments, the released first combustion exhaust is released as flue gas 152.

The processing chamber 110 comprises a cuttings inlet 154, through which wet drill cuttings 156 are received into the processing chamber 110, a dry solids outlet 158, an evaporated drilling fluids outlet 160 and a second mixture inlet 162 configured to receive the heated second mixture 146 directly or indirectly from the heat transfer device 106.

In particular, the second mixture inlet 162 is in fluid communication with the outlet 148 of the heat transfer device 106.

Processor 108 may be any mechanical device or combination of mechanical devices configured to distribute hot gases into drill cuttings received by the processing chamber 110. The components of the processor 108, including those of the processing chamber 110, are selected to operate reliably at temperatures sufficient to vaporize the drilling fluids contaminating the wet drill cuttings 156. According to some embodiments, selection of the components of the processor 108 takes into consideration an additional safety margin to give a maximum failure temperature above a pre-determined operating temperature, as discussed further below.

The processor 108 is configured to provide the heated second mixture 146 to the processing chamber 110, directly or indirectly (such as via the second mixture inlet 162), to contact and directly heat the received wet drill cuttings 156 by convection so that at least a portion of the drilling fluid is evaporated therefrom and at least some dry solid cuttings remain. According to some embodiments, the processor 108 operates at a temperature above the saturation temperature of the evaporated drilling fluids 164. According to some embodiments, the processor 108 is configured to agitate or mechanically mix the wet drill cuttings 156 received into the processing chamber 110 while the heated second mixture 146 is being provided thereto. The agitation or mechanical mixing helps facilitate the heating and drying of the wet cuttings by conduction, and to transfer heat from drier drill cuttings to less dry drill cuttings. Any suitable device or combination of devices or components to agitate or mechanically mix the drill cuttings is contemplated.

Figure 1B:
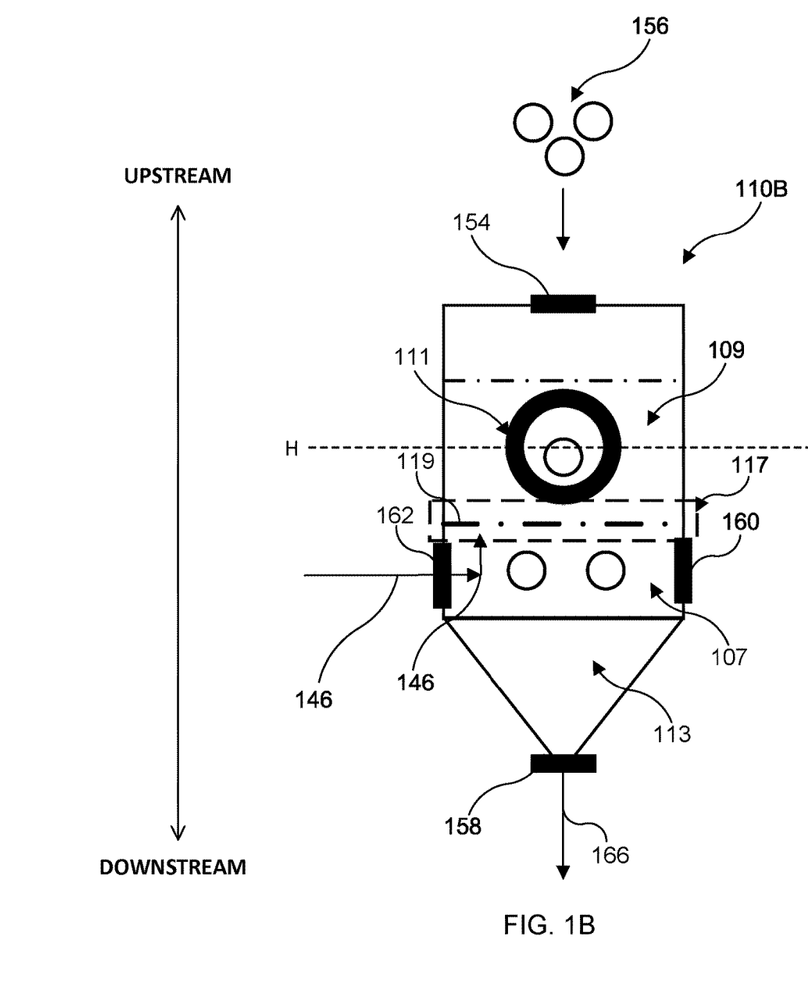
FIG. 1B depicts a processing chamber of a system for removing drilling fluid from wet drill cuttings, according to non-limiting embodiments.

Attention is directed to FIG. 1B, which depicts example processing chamber 110B according to non-limiting embodiments and in which like or similar elements are denoted by like or similar numbers in FIG. 1A. For simplicity and ease of understanding, discussion of the systems and devices depicted in FIG. 1B will focus on certain similarities and differences from those depicted in FIG. 1A. Processing chamber 110B comprises fixed stage 107 and agitator stage 109. Fixed stage 107 is in fluid communication with second mixture inlet 162 and configured to receive processing gas (e.g., the heated second mixture 146). Fixed stage 107 comprises fixed bed 119, which comprises at least one fluidly permeable interface operatively connected to second mixture inlet 162. Agitator stage 109 is in fluid communication with fixed bed 119 and configured to receive processing gas therefrom. As shown in FIG. 1B, agitator stage 109 may be upstream fixed stage 107. Agitator stage 107 is also operatively connected to cuttings inlet 154 to receive wet drill cuttings 156 therefrom. In addition, agitator stage 107 comprises at least one mixing device, such as mixing device 111, configured to agitate wet drill cuttings 156 received via cuttings inlet 154. According to some embodiments, mixing device 111 is a mechanical mixing device.

According to some embodiments, processing chamber 110B further comprises a purging device 113 downstream fixed stage 107 and configured to compel at least a portion of the dry solid drill cuttings 166 for receipt by the dry solids outlet 158. According to some embodiments, purging device 113 comprises a screw conveyor configured to remove at least a portion of the processed cuttings from the bottom of fixed stage 107.

According to some embodiments, fixed stage 107 comprises a heat distribution system 117 configured to distribute the processing gas across at least one heat distribution plane of agitator stage 109, such as heat distribution plane H-H (which may be parallel to an axial plane of mixing device 111).

In operation, process gas (e.g., the heated second mixture 146) received from second mixture inlet 162 is distributed into fixed bed 119. According to some embodiments, the process gas is distributed across a plane parallel to the axial plane of mixing device 111, for example, (which may be a mechanical tumbling device), and downstream the area agitated by mixing device 111, forming a fixed, heated bed downstream the agitator stage 109.

Introducing process gas to wet drill cuttings 156 in stages (a fixed stage and an agitator stage) may provide for uniform distribution of the process gas to wet drill cuttings 156, which may provide for more uniform and efficient heat transfer while also providing more of the process gas to the interior of the processing chamber 110B than externally (for better thermal efficiency). In addition, combining a fixed stage and an agitator stage may also provide for increased residence time for agglomerates to dry. As the agglomerates dry, fine particles that are released usually tend to migrate up to the agitator stage while heavier particles may remain. A purging device may be used to assist in the downstream migration of the heavier particles and agglomerates into the fixed stage.

As shown in FIG. 1A, for example, the processor 108 is further configured to provide the evaporated drilling fluid 164 to the evaporated drilling fluids outlet 160 for recovery therefrom and to provide the dry solid drill cuttings 166 to the dry solids outlet 158 for recovery therefrom.

The at least one condensing device 112 comprises a condenser inlet 168 in fluid communication with the evaporated drilling fluids outlet 160. The at least one condensing device 112 is configured to condense at least a portion of the evaporated drilling fluids 164 received directly or indirectly from the evaporated drilling fluids outlet 160 (such as via the condenser inlet 168), and to provide condensed drilling fluid 170 to a condenser outlet 172 for recovery therefrom. Any suitable device or combination of devices for condensing at least a portion of the evaporated drilling fluids 164 are contemplated.

As discussed above, a feature of the described systems and methods is using a very hot process gas stream to directly heat and dry the wet drill cuttings. The oxygen level of the post-combustion process gas is in a range low enough to allow the process gas to reach an elevated temperature sufficient for thermal desorption of the drilling fluids and to achieve a lower risk of explosion than process gas having excess oxygen (lean mixture). For example, U.S. Pat. No. 6,695,077 (Szymocha et al.), which is incorporated herein by reference, recommends maintaining an oxygen level below 8% on a mole fraction basis to prevent explosion of the drilling fluid vapor. According to some embodiments, the oxygen level in the process gas stream is about 8% or less. According to some embodiments, the oxygen level in the process gas stream is about 1%. According to some embodiments, the oxygen level in the process gas stream is in the range of about 1% to about 2% or in the range of about 1% to about 8%. The elevated temperature of the second mixture 146 air in conjunction with the expected, slightly elevated combustion pressures will help force the process gas through the drill cutting solids, after which the pressure in the vapor space will only be slightly above atmospheric. The low oxygen level of the process gas stream provides for minimum excess gas to heat, higher process gas temperatures and, in combination with the high degree of nitrogen dilution, minimizes potential for any unwanted chemical reactions. The exact oxygen level realized in operation may be determined by the degree of second mixture 146 is heated prior to receipt by the processing chamber 110 and the back pressure in the combustion chamber 104.

According to some embodiments, the temperature of the hot process gas stream is in a range of about 300° C. to about 500° C., or a range of about 300° C. to about 400° C., or a range of about 400° C. to about 500° C. According to some embodiments, the temperature of the hot process gas stream is about 500° C. According to some embodiments, the temperature of the hot process gas stream is in the range of about 700° C. to about 900° C. It is understood that the inlet temperature of the processing chamber second mixture inlet 162, and associated ducts/nozzles, may be higher, and material selection may take these higher temperatures into account. For example, the temperature profile of the processor 108, including the processing chamber 110, after the process gas enters the processing chamber 110 is such that the process gas gives up its heat typically within a few inches to asymptotically approach the process gas temperatures described above.

Figure 2:
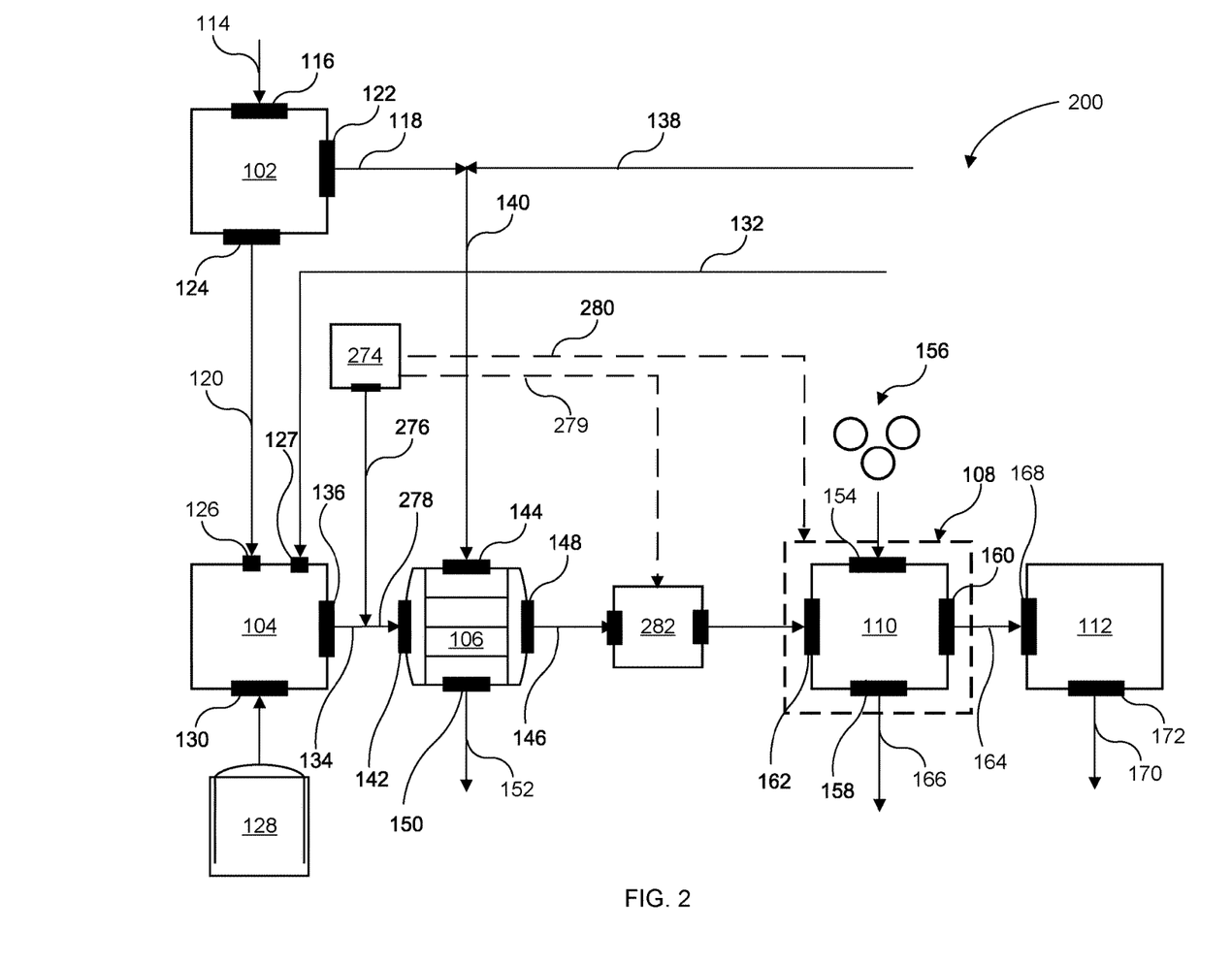
FIG. 2 depicts a system for removing drilling fluid from wet drill cuttings, according to a second set of non-limiting embodiments.

According to some embodiments, the described systems and methods include components to further assist in heating the second mixture 140. Attention is directed to FIG. 2, which depicts example system 200 for removing drill fluid from wet drill cuttings, according to non-limiting embodiments, and in which like or similar elements are denoted by like or similar numbers in FIG. 1A or 1B. For simplicity and ease of understanding, discussion of the systems and devices depicted in FIG. 2 will focus on certain similarities and differences from those depicted in FIG. 1A or 1B.

Similarly to example system 100, example system 200 comprises the nitrogen gas generator 102, the combustion chamber 104, the heat transfer device 106, the processor 108 and the at least one condensing device 112. In addition, example system 200 comprises a natural gas powered generator 274 or other suitable natural gas powered device (e.g., an engine) that is configured to produce natural gas exhaust 276. The natural gas exhaust 276 provides additional heat to be transferred to the second mixture 140, which may improve overall thermal efficiency. For example, according to some embodiments, at least a portion of the natural gas exhaust 276 is combined with the first combustion exhaust 134 (as combined exhaust 278) prior to receipt by the heat transfer device 106, as shown in FIG. 2. However, according to some embodiments, the natural gas exhaust 276 is provided separately to the heat transfer device 106 from the first combustion exhaust 134, and then combined with the first combustion exhaust 134 therein. The second mixture 140 is heated by transferring heat from the combined exhaust 278 or separately from the natural gas exhaust 276 and the first combustion exhaust 134. According to some embodiments, the natural gas-powered generator 274 is configured to provide the natural gas exhaust 276 to combine with the second mixture 146 to supplement the heated, inert process gas. According to some embodiments, the natural gas exhaust 276 is provided to the processing chamber 110 separately from the second mixture 146 and then combined with the second mixture 146 therein.

According to some embodiments, the natural gas-powered generator 274 provides motive force and/or electricity to the processor 108 and/or other system components. For example, the natural gas-powered generator 274 may provide at least some shaft power 280 to the processor 108. As another example, the natural gas-powered generator 274 may provide at least some electricity to other system components.

According to some embodiments, example system 200 comprises a heating device 282 to further heat the second mixture 146 prior to receipt by the processing chamber 110. Any suitable device or combination of devices for heating the second mixture 146 is contemplated. According to some embodiments, the heating device 282 is an electric heating device. According to some embodiments, the natural gas-powered generator 274 is configured to provide at least some electricity and/or motive force to the heating device 282 (such as motive force and/or electricity 279).

Figure 3:
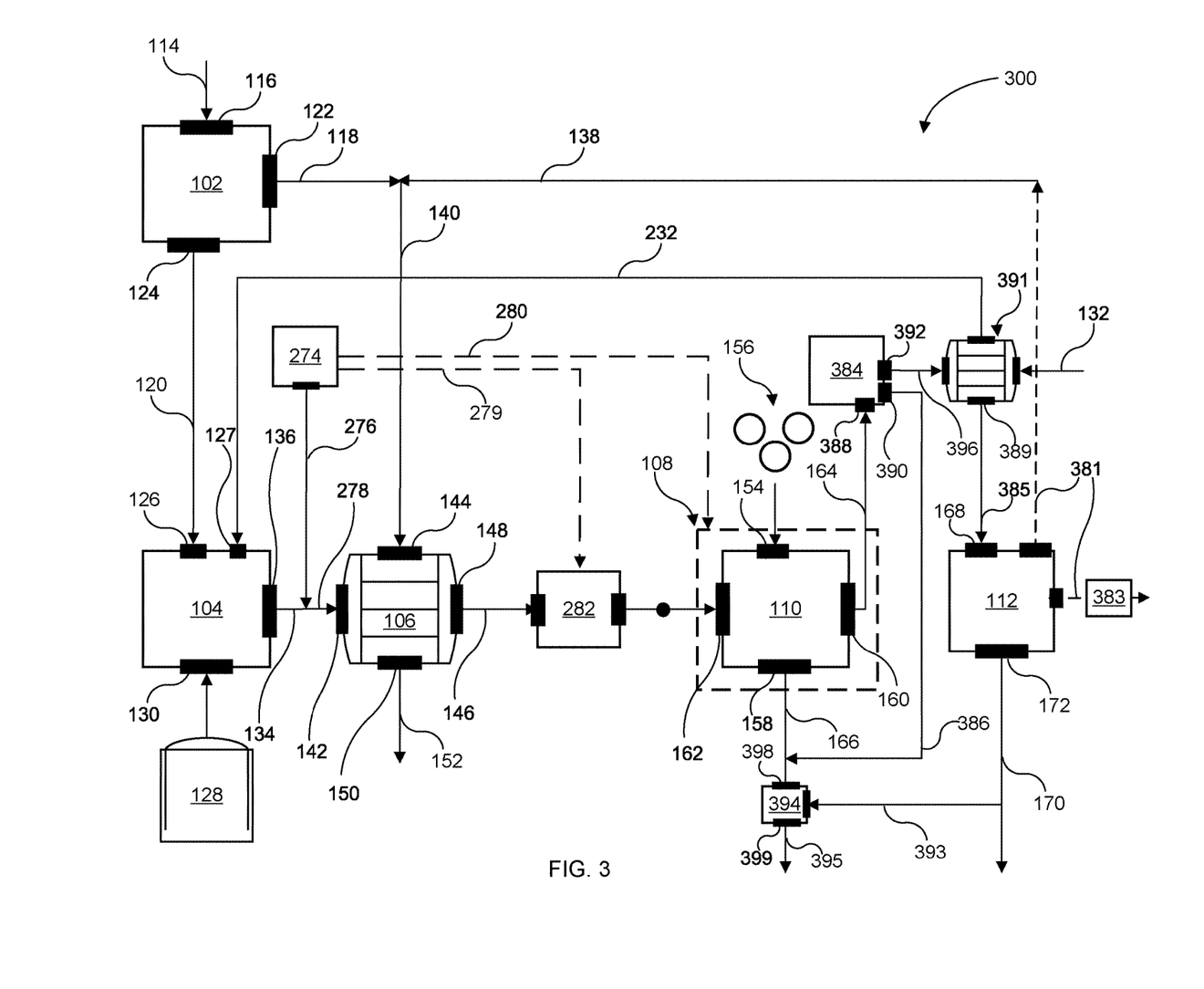
FIG. 3 depicts, a system for removing drilling fluid from wet drill cuttings, according to a third set of non-limiting embodiments.

According to some embodiments, the described systems and methods comprise features to facilitate the recovery of solids and/or fluids, and to reduce waste constituents. Attention is directed to FIG. 3, which depicts example system 300 for removing drilling fluid from wet drill cuttings, according to non-limiting embodiments, and in which like or similar elements are denoted by like or similar numbers in FIGS. 1A to 2. For simplicity and ease of understanding, discussion of the systems and devices depicted in FIG. 3 will focus on certain similarities and differences from those depicted in FIGS. 1A to 2.

As shown in FIG. 3, example system 300 further comprises a fine filter 384 in fluid communication with the evaporated drilling fluids outlet 160 and configured to separate fine solid drill cuttings 386 from the evaporated drilling fluids 164. For example, the fine filter 384 comprises at least one filter inlet 388 in fluid communication with the evaporated drilling fluids outlet 160 and at least one filter outlet, such as filter outlets 390 and 392. The filtered evaporated drilling fluids 396 are provided to filter outlet 392 for delivery to the condensing device 112, directly or indirectly, therefrom. According to some embodiments, the fine solid drill cuttings 386 are recovered from the filter outlet 390, separately from the dry solid drill cuttings 166. According to some embodiments, the fine solid drill cuttings 386 are recovered with the dry solid drill cuttings 166 (as shown in FIG. 3).

According to some embodiments, example system 300 comprises a solids cooling device 394 configured to receive the dry solid drill cuttings 166, directly or indirectly, from the dry solids outlet 158. The solids cooling device 394 comprises at least one dry solids inlet 398 for receiving the dry solid drill cuttings 166 and/or fine solid drill cuttings 386 and at least one cooled dry solids outlet 399 for recovery of cooled dry solids 395, directly or indirectly, therefrom.

According to some embodiments, example system 300 comprises a second heat transfer device 391 in fluid communication with the evaporated drilling fluids outlet 160 and the air inlet 127 of the combustion chamber 104. The second heat transfer device 391 is configured to receive the evaporated drilling fluids 164, directly or indirectly, from the evaporated drilling fluids outlet 160, and the air (such as combustion air 132) for the first mixture from which the first combustion exhaust 134 is produced. The second heat transfer device 391 is further configured to transfer heat from the evaporated drilling fluids 164 (or filtered evaporated drilling fluids 396) to the received air (such as combustion air 132 to produce heated combustion air 232). This heat transfer will generally pre-heat the air prior to mixing with the hydrocarbon-based fuel (such as natural gas) for combustion by the combustion chamber 104 and, usually, at least partially condense the received evaporated drilling fluids 164 (or filtered evaporated drilling fluids 396). The at least partially condensed evaporated drilling fluids 385 are provided to heat transfer device outlet 389 for receipt by the condensing device 112. According to some embodiments, the second heat transfer device 391 is a heat exchanger; however, any suitable heat transfer device or combination of suitable heat transfer devices is contemplated.

According to some embodiments, the solids cooling device 394 is configured to receive water for cooling the received dry solid drill cuttings 166. For example, according to some embodiments, the solids cooling device 394 is configured to receive water from a reservoir or other suitable source. According to some embodiments, waste water and/or water recycled from components of the systems described herein is provided to the solids cooling device 394. Using waste water may results in a side benefit of reducing the volume of wastewater sent to disposal wells as it cools by evaporation. For example, according to some embodiments, the second heat transfer device 391 and/or the condensing device 112 is configured to separate at least some water 393 from the condensed drilling fluid 170 and to provide the recovered water 393 to the solids cooling device 394. According to some embodiments, as depicted in FIG. 3, the solids cooling device 394 comprises at least one water inlet 397 that is in fluid communication with condensing device outlet 172 and/or the heat transfer device outlet 389.

According to some embodiments, a portion of the condensed drilling fluid 170 or of the at least partially condensed evaporated drilling fluids 385 comprises non-condensable inert gas 381. According to some embodiments, the system 300 comprises a flare stack 383 configured to receive and purge at least a portion of the non-condensable inert gas 381. According to some embodiments, at least a portion of the non-condensable inert gas 381 is recycled to be provided as part of the non-condensable inert gas 138.

According to some embodiments, the systems and methods described herein may comprise additional devices and features to help monitor and/or modify characteristics of the fluid flow, such as the oxygen level, carbon monoxide level and flow rate, to help improve thermal efficiency, reduce waste products and/or conserve fuel. For example, according to some embodiments, the described systems, such as example system 300, further comprises at least one sensor, such as sensor 353, configured to determine an oxygen level and/or a carbon monoxide level of the process gas being provided to the processing chamber 110 (such as the process gas comprised of the second mixture 146 and/or the natural gas exhaust 276). Any suitable sensing device or combination of sensing devices is contemplated.

According to some embodiments, the systems comprise at least one controller 355 operatively connected to the at least one sensor. The at least one controller 355 is configured to monitor the determined oxygen and/or carbon monoxide level(s) and to perform at least one safety action based on a predetermined threshold. For example, according to some embodiments, when the determined oxygen and/or carbon monoxide level(s) exceed or fall below a predetermined threshold, the at least one controller 355 is configured to trigger an audible and/or visible alarm and/or shutdown operation of the system.

Figure 4:
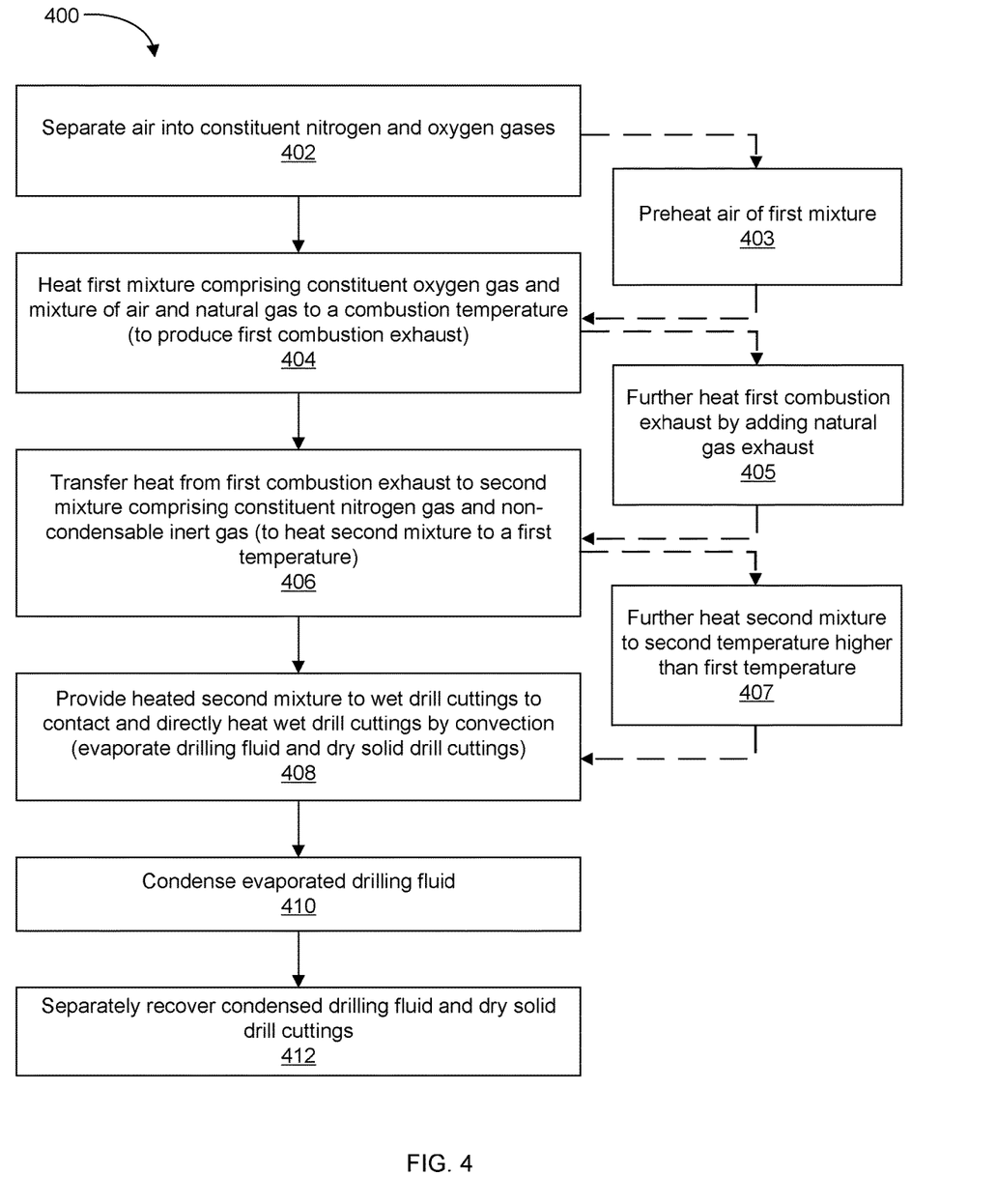
FIG. 4 depicts a method for removing drilling fluid from wet drill cuttings, according to non-limiting embodiments.

Attention is now directed to FIG. 4, which depict a flowchart of a method 400 for removing drilling fluid from wet drill cuttings. In order to assist with the explanation of method 400, it will be assumed that the method id performed using example systems 100 to 300, as indicated. Furthermore, the following discussion of method 400 will lead to a further understanding of systems 100 to 300, and the various components of those systems. However, it is to be understood that systems 100 to 300 and/or method 400 can be varied and need not work exactly as discussed herein in conjunction with each other, and that such variations are within the scope of the present embodiments. It is to be emphasized, however, that method 400 need not be performed in the exact sequence as shown, unless otherwise indicated; and likewise various blocks may be performed in parallel rather than in sequence. Hence, the elements of method 400 are referred to herein as "blocks" rather than "steps". It is also to be understood, however, that method 400 can be implemented on variations of systems 100 to 300 as well.

As discussed above, the described methods, including method 400, are performed at a pressure above atmospheric pressure. At block 402, air is separated into constituent nitrogen and oxygen gases. For example, according to some embodiments, a nitrogen generator (such as nitrogen generator 102) is used to perform block 402; however, any suitable device or combination of devices is contemplated. At block 404, a first mixture comprising the constituent oxygen gas with a mixture of air and natural gas is heated to a combustion temperature, $T_C$, thereby producing a first combustion exhaust (such as first combustion exhaust 134). At block 406, heat is transferred from the first combustion exhaust to a second mixture that comprises the constituent nitrogen gas and non-condensable inert gas, thereby heating the second mixture to a first temperature, $T_1$. For example, according to some embodiments, a heat transfer device, such as heat transfer device 106, is utilized to transfer to heat the second mixture. At block 408, the heated second mixture is provided to the wet drill cuttings to contact and directly heat the wet drill cuttings by convection so that at least a portion of the drilling fluid is evaporated therefrom and at least some dry solid drill cuttings remain. At block 410, at least a portion of the evaporated drilling fluid to produce condensed drilling fluid. At block 412, the condensed drilling fluid and the dry solid drill cuttings are separately recovered.

As discussed above, the methods and systems described herein may be varied to improve thermal efficiency. For example, according to some embodiments, the air of the first mixture is pre-heated prior to heating the first mixture to $T_C$ (block 403). According to some embodiments, this pre-heating comprises transferring at least a portion of heat from the evaporated drilling fluids to the air of the first mixture. At block 405, the first combustion exhaust may be heated by adding natural gas exhaust prior to simultaneously with block 406 (which may be provided by natural gas-powered generator 274 or other suitable natural gas-powered device). At block 407, the second mixture (the "process gas") is further heated to a second temperature, $T_2$, higher than the first temperature, $T_1$, prior to being provided to the wet drill cuttings at block 408.

As discussed above, the methods and systems described herein utilize a heated process gas of ostensibly inert gas(es) to contact and directly heat wet drill cuttings by convection so that at least a portion of the drilling fluid is evaporated therefrom and at least some dry solid drill cuttings remain. In systems 100 to 300 and method 400, a nitrogen generator is utilized to help produce the process gas (e.g., the second mixture 140 of constituent nitrogen gas 118 output from nitrogen generator 102 and non-condensable inert gas 138). However, according to some embodiments, the ostensibly inert process gas is produced without the assistance of a nitrogen generator.

Figure 5:
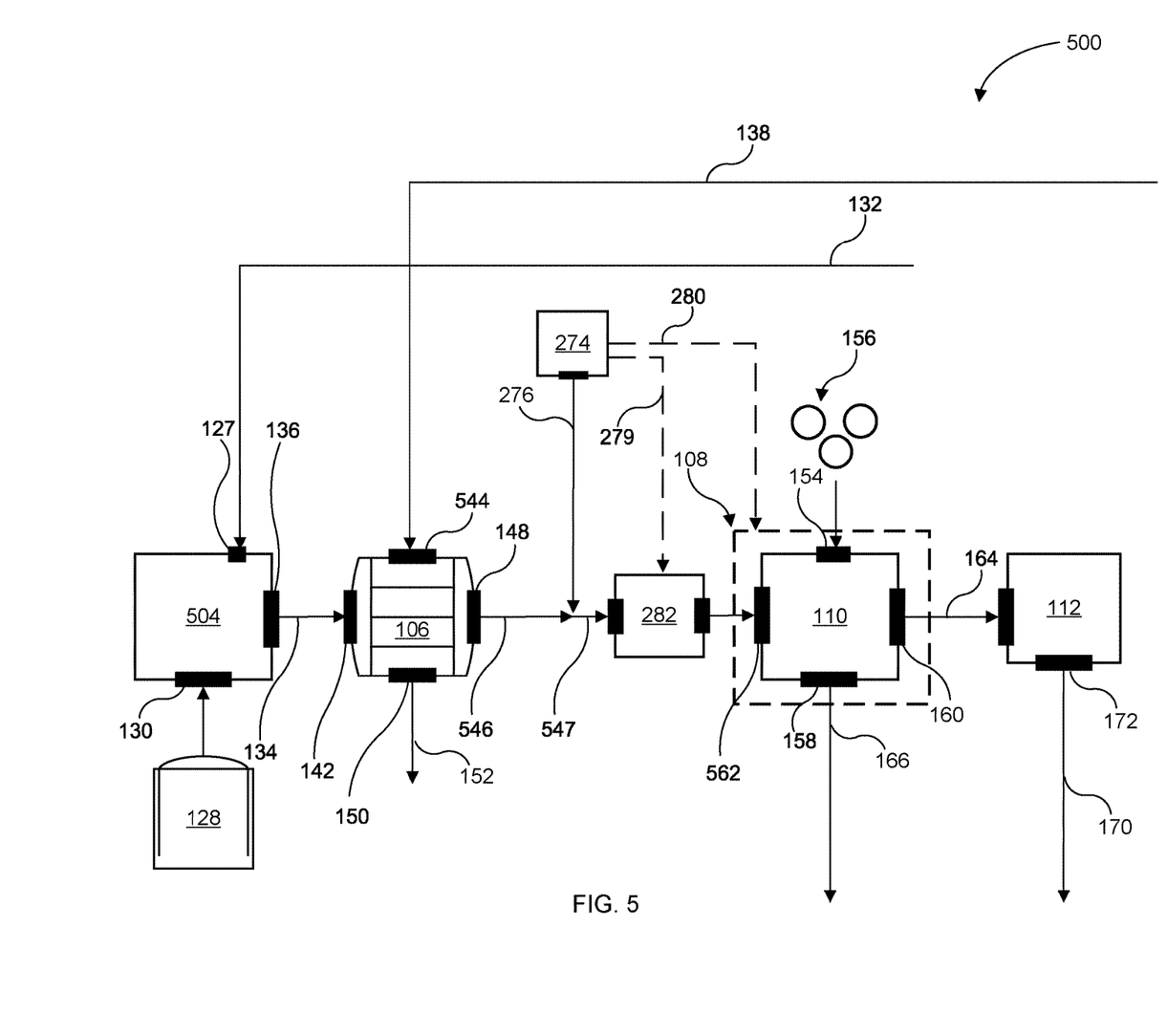
FIG. 5 depicts a system for removing drilling fluid from wet drill cuttings, according to a fourth set of non-limiting embodiments

Attention is directed to FIG. 5, which depicts example system 500 for removing drilling fluid from wet drill cuttings, according to non-limiting embodiments, and in which like or similar elements are denoted by like or similar numbers in FIGS. 1A to 3. For simplicity and ease of understanding, discussion of the systems and devices depicted in FIG. 5 will focus on certain similarities and differences from those depicted in FIGS. 1A to 3. As shown, example system 500 comprises a combustion chamber 504, the heat transfer device 106, the processor 108 (and processing chamber 110) and the at least one condensing device 112. The combustion chamber 504 comprises the air inlet 127, fuel inlet 130 and combustion exhaust outlet 130. The combustion chamber 504 is configured to receive air, such as combustion air 132, via air inlet 127 and hydrocarbon based fuel via fuel inlet 130 (provided from any suitable fuel source, such as natural gas fuel source 128 or flue gas), and to heat a first mixture of the received air and fuel to a combustion temperature, $T_C$, to thereby produce the combustion exhaust 134. As in example systems 100 to 300, the combustion exhaust 134 is provided to the heat transfer device 106, which transfers heat therefrom to another fluid. In particular, the heat transfer device 106 is configured to transfer heat from the received combustion exhaust 134 to non-condensable inert gas 138 (received via inlet 544), thereby heating the non-condensable inert gas 138 to a first temperature (to produce heated non-condensable inert gas 546).

Similarly to example system 200, example system 500 also comprises the natural gas powered generator 274 or other suitable natural gas powered device (e.g., an engine) configured to produce natural gas exhaust 276 (also referred to herein as a natural gas exhaust generating device). However, in example system 500, the natural gas powered generator 274 is configured to provide at least a portion of the ostensibly inert gas (process gas) and, according to some embodiments, provide additional heat to the heated non-condensable inert gas 546. For example, according to some embodiments, at least a portion of the natural gas exhaust 276 is combined with the non-condensable inert gas 546 (to produce gas mixture 547) for delivery to the processing chamber 110 (via inlet 562, also referred to herein as process gas inlet 562). By way of another example, according to some embodiments, the natural gas exhaust 276 is provided separately to the processing chamber 110 from the non-condensable inert gas 546 and then combined therein (e.g., the processing chamber 110 may be configured to receive the natural gas exhaust 276 via an inlet separate from the inlet through which the heated non-condensable inert gas 546 is received into the processing chamber 110).

According to some embodiments, example system 500 further comprises heating device 282 configured to receive and further heat at least one of the heated non-condensable inert gas 546 and the natural gas exhaust 276 to a second temperature higher than the first temperature prior to receipt by the processing chamber 110 (via the process gas inlet 562 or any other suitable inlet of the processing chamber 110). Similarly to example system 200, the heating device 282 comprises any suitable device or combination of devices for heating the heated non-condensable inert gas 546 and/or the natural gas exhaust 276 is contemplated (e.g., suitable for heating the gas mixture 547). According to some embodiments, the heating device 282 is an electric heating device.

Persons skilled in the art will appreciate that, for simplicity, some components that may facilitate safe, reliable operation of the system have been omitted. Such components include, but are not limited to, various sensors, valves, pumps, blowers, material handling equipment, pressure controls, backflow preventer devices and air locks. Additional means of improving thermal and energy efficiency may be incorporated in the described methods and systems. For example, additional heat recovery equipment may be included to minimize net heat loss. Such equipment may be sized to provide the desired heat input for expected or desired flow rates and liquid content, according to known teachings. The equipment may also be sized such that it has extra capacity and ability to modulate the described operations with varying input parameters.

A collection of exemplary examples, including at least some explicitly enumerated "ECs" (Example Combinations), providing additional description of a variety of example types in accordance with the concepts described herein are provided below. These examples are not meant to be mutually exclusive, exhaustive or restrictive; and the invention is not limited to these example examples but rather encompasses all possible modification and variations within the scope of the issued claims and their equivalents.

EC 1. A method for removing drilling fluid from wet drill cuttings, comprising: at a pressure above atmospheric pressure: separating air into constituent nitrogen and oxygen gases; heating a first mixture comprising the constituent oxygen gas with a mixture of air and natural gas to a combustion temperature to produce a first combustion exhaust; transferring heat from the first combustion exhaust to a second mixture comprising the constituent nitrogen gas and non-condensable inert gas, thereby heating the second mixture to a first temperature; providing the heated second mixture to the wet drill cuttings to contact and directly heat the wet drill cuttings by convection so that at least a portion of drilling fluid is evaporated therefrom and at least some dry solid drill cuttings remain; condensing at least a portion of the evaporated drilling fluid to produce condensed drilling fluid; and separately recovering the condensed drilling fluid and the dry solid drill cuttings.

EC 2. The method of any one of the preceding or subsequent example combinations further comprising: prior to being provided to the wet drill cuttings, further heating the second mixture to a second temperature higher than the first temperature.

EC 3. The method of any one of the preceding or subsequent example combinations further comprising: agitating the wet drill cuttings while providing the heated second mixture to the wet drill cuttings.

EC 4. The method of any one of the preceding or subsequent example combinations further comprising: cooling the dry solid drill cuttings.

EC 5. The method of any one of the preceding or subsequent example combinations further comprising: treating the condensed drilling fluid to separate fine solid drill cuttings therefrom; wherein recovering the dry solid drill cuttings comprises recovering the fine solid drill cuttings and the dry solid drill cuttings.

EC 6. The method of any one of the preceding or subsequent example combinations, wherein the air of the first mixture is pre-heated prior to heating the first mixture to the combustion temperature.

EC 7. The method of any one of the preceding or subsequent example combinations, wherein pre-heating the air of the first mixture comprises transferring at least a portion of heat from the evaporated drilling fluids.

EC 8. The method of any one of the preceding or subsequent example combinations further comprising: purging at least a portion of non-condensable gas of the cooled evaporated drilling fluid, wherein at least some water and at least some non-condensable inert gas remains; and recycling the remaining non-condensable inert gas for mixing with the constituent nitrogen; wherein recovering the condensed drilling fluid comprises recovering the remaining water.

EC 9. The method of any one of the preceding or subsequent example combinations further comprising: recycling the remaining water for cooling the dry solid drill cuttings.

EC 10. A system for removing drilling fluid from wet drill cuttings, comprising: a nitrogen generator configured to receive air and to separate the air into constituent nitrogen and oxygen gases, the nitrogen generator having at least an air inlet, a nitrogen outlet and an oxygen outlet; a combustion chamber having at least an oxygen inlet, an air inlet and a combustion exhaust outlet, the combustion chamber configured to receive the constituent oxygen gas via the oxygen inlet therein and to receive a mixture of air and natural gas to produce a first mixture, and heat the first mixture to a first combustion temperature, thereby producing a first combustion exhaust for delivery to the combustion exhaust outlet; a first heat transfer device configured to receive the first combustion exhaust from the combustion chamber, receive the constituent nitrogen gas and non-condensable inert gas, the received constituent nitrogen gas and non-condensable inert gas comprising a second mixture, and transfer heat from the first combustion exhaust to the second mixture, thereby heating the second mixture to a first temperature; a processor having a processing chamber, the processing chamber having at least one cuttings inlet through which the wet drill cuttings are received into the processing chamber, an evaporated drilling fluids outlet, a dry drilling solids outlet and a second mixture inlet configured to receive the second mixture directly or indirectly from the first heat transfer device, wherein the processor is configured to provide the heated second mixture to the processing chamber to contact and directly heat the wet drill cuttings by convection so that at least a portion of drilling fluid is evaporated therefrom and at least some dry solid drill cuttings remain, provide evaporated drilling fluid to the evaporated drilling fluids outlet for recovery therefrom, and provide dry solid drill cuttings to the dry solids outlet for recovery therefrom; and at least one condensing device having a condenser inlet in fluid communication with the evaporated drilling fluids outlet, the at least one condensing device configured to condense at least a portion of the evaporated drilling fluids received directly or indirectly from the evaporated drilling fluids outlet and to provide condensed drilling fluid to a condenser outlet for recovery therefrom; wherein the nitrogen generator, the natural gas fired generator, the combustion chamber, the heat transfer device, the processor and the at least one condensing device operate at a pressure above atmospheric pressure.

EC 11. The system of any one of the preceding or subsequent example combinations further comprising: a natural gas fired generator configured to produce natural gas exhaust; wherein the combustion chamber is further configured to add the natural gas engine exhaust to the first combustion exhaust to produce a combined combustion exhaust; and wherein, the first transfer device is further configured to receive the combined combustion exhaust, and transfer heat from the combined combustion exhaust to the second mixture.

EC 12. The system of any one of the preceding or subsequent example combinations further comprising: a natural gas fired generator configured to produce natural gas exhaust; wherein the processor is further configured to receive the natural gas exhaust, directly or indirectly, from the natural gas fired generator, and provide the natural gas exhaust to the processing chamber with the heated second mixture to contact and directly heat the wet drill cuttings by convection.

EC 13. The system of any one of the preceding or subsequent example combinations further comprising: a heating device configured to receive and further heat at least one of the heated second mixture and the natural gas exhaust prior to receipt by the processing chamber.

EC 14. The system of any one of the preceding or subsequent example combinations, wherein the natural gas fired generator provides power to the heating device.

EC 15. The system of any one of the preceding or subsequent example combinations, wherein the heating device is an electrical heater.

EC 16. The system of any one of the preceding or subsequent example combinations further comprising: a solids cooling device configured to receive the dry solid drill cuttings directly or indirectly from the dry solids outlet.

EC 17. The system of any one of the preceding or subsequent example combinations further comprising: a fine filter in fluid communication with the evaporated drilling fluids outlet and configured to separate fine solid drill cuttings from the evaporated drilling fluids.

EC 18. The system of any one of the preceding or subsequent example combinations further comprising: a second heat transfer device in fluid communication with the evaporator fluids outlet of the processor and the air inlet of the combustion chamber, the second heat transfer device being configured to receive the evaporated drilling fluids and receive the air for the mixture of air and the natural gas exhaust, and transfer heat from the evaporated drilling fluids to the received air to pre-heat the air prior to mixing with the natural gas exhaust and to at least partially condense the evaporated drilling fluids.

EC 19. The system of any one of the preceding or subsequent example combinations further comprising: a flare stack configured to receive a portion of the non-condensable gases from the at least one condensing and to at least partially burn off the portion of the non-condensable gas of the evaporated drilling fluids.

EC 20. The system of any one of the preceding or subsequent example combinations, wherein the condensing device is further configured to provide: at least one of the non-condensable gas to be recycled as inert process heating gas via the combustion chamber; and, water to the at least one cooling device, as byproducts of condensing the evaporated drilling fluids.

EC 21. The system of any one of the preceding or subsequent example combinations, wherein the processing chamber is further configured to agitate the wet drill cuttings in the processing chamber while the heated second mixture is being provided thereto.

EC 22. The system of any one of the preceding or subsequent example combinations, wherein the processor operates at a temperature above the saturation temperature of the evaporated drilling fluids.

EC 23. A method for removing drilling fluid from wet drill cuttings, comprising: at a pressure above atmospheric pressure: combusting a first mixture of air and fuel to a combustion temperature, thereby producing a combustion exhaust; transferring heat from the combustion exhaust to a non-condensable inert gas, thereby heating the non-condensable inert gas to a first temperature; providing the non-condensable inert gas and natural gas exhaust to the wet drill cuttings to contact and directly heat the wet drill cuttings by convection so that at least a portion of drilling fluid is evaporated therefrom and at least some dry solid drill cuttings remain; condensing at least a portion of the evaporated drilling fluid to produce condensed drilling fluid; and separately recovering the condensed drilling fluid and the dry solid drill cuttings.

EC 24. The method of any one of the preceding or subsequent example combinations further comprising: prior to being provided to the wet drill cuttings, further heating at least one of the non-condensable inert gas and the natural gas exhaust to a second temperature higher than the first temperature.

EC 25. The method of any one of the preceding or subsequent example combinations, wherein the fuel is natural gas.

EC 26. A system for removing drilling fluid from wet drill cuttings, comprising: a combustion chamber having at least one air inlet, at least one fuel inlet and a combustion exhaust outlet, the combustion chamber configured to receive air via the at least one air inlet, receive fuel via the at least one fuel inlet from a fuel source, and heat a mixture of the air and the fuel to a combustion temperature, thereby producing a combustion exhaust for delivery to the combustion exhaust outlet; a heat transfer device configured to receive the combustion exhaust from the combustion chamber, receive non-condensable inert gas, and transfer heat from the received combustion exhaust to the received non-condensable inert gas, thereby heating the non-condensable inert gas to a first temperature; a natural gas exhaust generating device; a processor having a processing chamber, the processor chamber having at least one cuttings inlet through which the wet drill cuttings are received into the processing chamber, an evaporated drilling fluids outlet, a dry drilling solids outlet, at least one process gas inlet through which at least one of the heated non-condensable inert gas and the natural gas exhaust is received into the processing chamber, wherein the processor is configured to provide process gas comprising at least one of the heated non-condensable inert gas and the natural gas exhaust to contact and directly heat the wet drill cuttings by convection so that at least a portion of drilling fluid is evaporated therefrom and at least some dry solid drill cuttings remain, provide evaporated drilling fluid to the evaporated drilling fluids outlet for recovery therefrom, and provide dry solid drill cuttings to the dry solids outlet for recovery therefrom; and at least one condensing device having a condenser inlet in fluid communication with the evaporated drilling fluids outlet, the at least one condensing device configured to condense at least a portion of the evaporated drilling fluids received directly or indirectly from the evaporated drilling fluids outlet and to provide condensed drilling fluid to a condenser outlet for recovery therefrom; wherein the combustion chamber, the heat transfer device, the natural gas exhaust generating device, the processor and the at least one condensing device operate at a pressure above atmospheric pressure.

EC 27. The system of any one of the preceding or subsequent example combinations further comprising: a heating device configured to receive and further heat at least one of the heated non-condensable inert gas and the natural gas exhaust prior to receipt by the processing chamber via the at least one process gas inlet.

EC 28. The system of any one of the preceding or subsequent example combinations, wherein the heating device is an electric heater.

EC 29. The system of any one of the preceding or subsequent example combinations, wherein the natural gas exhaust generating device is a natural gas-powered engine or a natural gas-powered generator.

EC 30. A processor for removing drilling from wet drill cuttings, comprising: a processing chamber, the processing chamber having a cuttings inlet through which the wet drill cuttings are received into the processing chamber, an evaporated drilling fluids outlet, a dry drilling solids outlet, a process gas inlet configured to receive process gas, a fixed stage comprising a fixed bed in fluid communication with the process gas inlet and configured to receive the process gas therefrom, an agitator stage upstream of and in fluid communication with the fixed bed and configured to receive the process gas therefrom, the agitator stage operatively connected to the cuttings inlet and having a mixing device configured to agitate the wet drill cuttings received therefrom. The processor is configured to: provide the process gas to the fixed bed and the agitator stage, thereby heating the fixed bed and agitator stage so as to heat and agitate the wet drill cuttings so that at least a portion of drilling fluid is evaporated therefrom and at least some dry solid drill cuttings remain, provide evaporated drilling fluid to the evaporated drilling fluids outlet for recovery therefrom, and provide dry solid drill cuttings to the dry solids outlet for recovery therefrom; and wherein the processor operates at a pressure above atmospheric pressure.

EC 31. A system for removing drilling fluid from wet drill cuttings, comprising: a combustion chamber having at least one air inlet, at least one fuel inlet and a combustion exhaust outlet, the combustion chamber configured to receive air via the at least one air inlet, receive fuel via the at least one fuel inlet from a fuel source, and heat a mixture of the air and the fuel to a combustion temperature, thereby producing a combustion exhaust for delivery to the combustion exhaust outlet; a heat transfer device configured to receive the combustion exhaust from the combustion chamber, receive non-condensable inert gas, and transfer heat from the received combustion exhaust to the received non-condensable inert gas, thereby heating the non-condensable inert gas to a first temperature; a natural gas exhaust generating device; a processor having a processing chamber, the processor chamber having at least one cuttings inlet through which the wet drill cuttings are received into the processing chamber, an evaporated drilling fluids outlet, a dry drilling solids outlet, at least one process gas inlet through which at least one of the heated non-condensable inert gas and the natural gas exhaust is received into the processing chamber, a fixed stage comprising a fixed bed in fluid communication with the at least one process gas inlet and configured to receive the process gas therefrom, an agitator stage upstream of and in fluid communication with the fixed bed and configured to receive the process gas therefrom, the agitator stage operatively connected to the at least one cuttings inlet and having a mixing device configured to agitate the wet drill cuttings received therefrom, wherein the processor is configured to provide process gas comprising at least one of the heated non-condensable inert gas and the natural gas exhaust to contact and directly heat the wet drill cuttings by convection so that at least a portion of drilling fluid is evaporated therefrom and at least some dry solid drill cuttings remain, provide evaporated drilling fluid to the evaporated drilling fluids outlet for recovery therefrom, and provide dry solid drill cuttings to the dry solids outlet for recovery therefrom; and at least one condensing device having a condenser inlet in fluid communication with the evaporated drilling fluids outlet, the at least one condensing device configured to condense at least a portion of the evaporated drilling fluids received directly or indirectly from the evaporated drilling fluids outlet and to provide condensed drilling fluid to a condenser outlet for recovery therefrom; wherein the combustion chamber, the heat transfer device, the natural gas exhaust generating device, the processor and the at least one condensing device operate at a pressure above atmospheric pressure; wherein providing the process gas comprising to contact and directly heat the wet drill cuttings by convection comprises providing the process gas to the agitator stage via the fixed bed and agitating the wet drill cuttings by the mixing device.

EC 32. The system of any one of the preceding or subsequent example combinations, wherein the mixing device is a mechanical mixing device.

EC 33. The system of any one of the preceding or subsequent example combinations further comprising: a purge system downstream the fixed stage and configured to compel at least a portion of the dry solid drill cuttings towards and for receipt by the dry solids outlet.

EC 34. The system of any one of the preceding example combinations, wherein the fixed stage comprises a heat distribution system configured to distribute the received process gas across at least one heat distribution plane of the agitator stage.

Persons skilled in the art will appreciate that there are yet more alternative implementations and modifications possible, and that the above examples are only illustrations of one or more implementations. The scope, therefore, is only to be limited by the claims appended hereto.

Interpretation

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Additionally, components in the present application may be described as "operatively connected to", "operatively coupled to", and the like, to other components. It is understood that such components are connected or coupled to each other in a manner to perform a certain function. It is also understood that "connections", "coupling" and the like, as recited in the present application include direct and indirect connections between components.

References in the application to "one embodiment", "an embodiment", "an implementation", "a variant", etc., indicate that the embodiment, implementation or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature of the invention.

The singular forms "a", "an", and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

What is claimed is:

1. A method for removing drilling fluid from wet drill cuttings, comprising:
at a pressure above atmospheric pressure:
separating air into constituent nitrogen and oxygen gases;
heating a first mixture comprising the constituent oxygen gas with a mixture of air and natural gas to a combustion temperature to produce a first combustion exhaust;
transferring heat from the first combustion exhaust to a second mixture comprising the constituent nitrogen gas and non-condensable inert gas, thereby heating the second mixture to a first temperature;
providing the heated second mixture to the wet drill cuttings to contact and directly heat the wet drill cuttings by convection so that at least a portion of drilling fluid is evaporated therefrom and at least some dry solid drill cuttings remain;
condensing at least a portion of the evaporated drilling fluid to produce condensed drilling fluid; and separately recovering the condensed drilling fluid and the dry solid drill cuttings.

2. The method of claim 1 further comprising:
prior to being provided to the wet drill cuttings, further heating the second mixture to a second temperature higher than the first temperature.

3. The method of claim 1 further comprising:
agitating the wet drill cuttings while providing the heated second mixture to the wet drill cuttings.

4. The method of claim 1 further comprising:
purging at least a portion of non-condensable gas of the cooled evaporated drilling fluid, wherein at least some water and at least some non-condensable inert gas remains; and
recycling the remaining non-condensable inert gas for mixing with the constituent nitrogen;
wherein recovering the condensed drilling fluid comprises recovering the remaining water.

5. A system for removing drilling fluid from wet drill cuttings, comprising:
a nitrogen generator configured to receive air and to separate the air into constituent nitrogen and oxygen gases, the nitrogen generator having at least an air inlet, a nitrogen outlet and an oxygen outlet;
a combustion chamber having at least an oxygen inlet, an air inlet and a combustion exhaust outlet, the combustion chamber configured to
receive the constituent oxygen gas via the oxygen inlet therein and to receive a mixture of air and natural gas to produce a first mixture, and
heat the first mixture to a first combustion temperature, thereby producing a first combustion exhaust for delivery to the combustion exhaust outlet;
a first heat transfer device configured to
receive the first combustion exhaust from the combustion chamber,
receive the constituent nitrogen gas and non-condensable inert gas, the received constituent nitrogen gas and non-condensable inert gas comprising a second mixture, and
transfer heat from the first combustion exhaust to the second mixture, thereby heating the second mixture to a first temperature;
a processor having a processing chamber, the processing chamber having
at least one cuttings inlet through which the wet drill cuttings are received into the processing chamber, an evaporated drilling fluids outlet, a dry drilling solids outlet and a second mixture inlet configured to receive the second mixture directly or indirectly from the first heat transfer device,
wherein the processor is configured to
provide the heated second mixture to the processing chamber to contact and directly heat the wet drill cuttings by convection so that at least a portion of drilling fluid is evaporated therefrom and at least some dry solid drill cuttings remain,
provide evaporated drilling fluid to the evaporated drilling fluids outlet for recovery therefrom, and
provide dry solid drill cuttings to the dry solids outlet for recovery therefrom; and
at least one condensing device having a condenser inlet in fluid communication with the evaporated drilling fluids outlet, the at least one condensing device configured to condense at least a portion of the evaporated drilling fluids received directly or indirectly from the evaporated drilling fluids outlet and to provide condensed drilling fluid to a condenser outlet for recovery therefrom;
wherein the nitrogen generator, the natural gas fired generator, the combustion chamber, the heat transfer device, the processor and the at least one condensing device operate at a pressure above atmospheric pressure.

6. The system of claim 5 further comprising:
a natural gas fired generator configured to produce natural gas exhaust;
wherein the combustion chamber is further configured to add the natural gas engine exhaust to the first combustion exhaust to produce a combined combustion exhaust; and
wherein, the first transfer device is further configured to receive the combined combustion exhaust, and transfer heat from the combined combustion exhaust to the second mixture.

7. The system of claim 6, wherein the natural gas fired generator provides power to the heating device.

8. The system of claim 5 further comprising:
a natural gas fired generator configured to produce natural gas exhaust;
wherein the processor is further configured to
receive the natural gas exhaust, directly or indirectly, from the natural gas fired generator, and
provide the natural gas exhaust to the processing chamber with the heated second mixture to contact and directly heat the wet drill cuttings by convection.

9. The system of claim 5 further comprising:
a heating device configured to receive and further heat at least one of the heated second mixture and the natural gas exhaust prior to receipt by the processing chamber.

10. The system of claim 5, wherein the condensing device is further configured to provide:
at least one of the non-condensable gas to be recycled as inert process heating gas via the combustion chamber; and,
water to the at least one cooling device, as byproducts of condensing the evaporated drilling fluids.

11. A method for removing drilling fluid from wet drill cuttings, comprising:
at a pressure above atmospheric pressure:
combusting a first mixture of air and fuel to a combustion temperature, thereby producing a combustion exhaust;
transferring heat from the combustion exhaust to a non-condensable inert gas, thereby heating the non-condensable inert gas to a first temperature;
providing the non-condensable inert gas and natural gas exhaust to the wet drill cuttings to contact and directly heat the wet drill cuttings by convection so that at least a portion of drilling fluid is evaporated therefrom and at least some dry solid drill cuttings remain;
condensing at least a portion of the evaporated drilling fluid to produce condensed drilling fluid; and
separately recovering the condensed drilling fluid and the dry solid drill cuttings.

12. The method of claim 11 further comprising:
prior to being provided to the wet drill cuttings, further heating at least one of the non-condensable inert gas and the natural gas exhaust to a second temperature higher than the first temperature.

13. A system for removing drilling fluid from wet drill cuttings, comprising:

a combustion chamber having at least one air inlet, at least one fuel inlet and a combustion exhaust outlet, the combustion chamber configured to
receive air via the at least one air inlet,
receive fuel via the at least one fuel inlet from a fuel source, and
heat a mixture of the air and the fuel to a combustion temperature, thereby producing a combustion exhaust for delivery to the combustion exhaust outlet;
a heat transfer device configured to
receive the combustion exhaust from the combustion chamber,
receive non-condensable inert gas, and
transfer heat from the received combustion exhaust to the received non-condensable inert gas, thereby heating the non-condensable inert gas to a first temperature;
a natural gas exhaust generating device;
a processor having a processing chamber, the processor chamber having
at least one cuttings inlet through which the wet drill cuttings are received into the processing chamber, an evaporated drilling fluids outlet, a dry drilling solids outlet, at least one process gas inlet through which at least one of the heated non-condensable inert gas and the natural gas exhaust is received into the processing chamber,
wherein the processor is configured to
provide process gas comprising at least one of the heated non-condensable inert gas and the natural gas exhaust to contact and directly heat the wet drill cuttings by convection so that at least a portion of drilling fluid is evaporated therefrom and at least some dry solid drill cuttings remain, provide evaporated drilling fluid to the evaporated drilling fluids outlet for recovery therefrom, and
provide dry solid drill cuttings to the dry solids outlet for recovery therefrom; and
at least one condensing device having a condenser inlet in fluid communication with the evaporated drilling fluids outlet, the at least one condensing device configured to condense at least a portion of the evaporated drilling fluids received directly or indirectly from the evaporated drilling fluids outlet and to provide condensed drilling fluid to a condenser outlet for recovery therefrom;
wherein the combustion chamber, the heat transfer device, the natural gas exhaust generating device, the processor and the at least one condensing device operate at a pressure above atmospheric pressure.

14. The system of claim 13 further comprising:
a heating device configured to receive and further heat at least one of the heated non-condensable inert gas and the natural gas exhaust prior to receipt by the processing chamber via the at least one process gas inlet.

15. The system of claim 14, wherein the heating device is an electric heater.

16. A processor for removing drilling fluid from wet drill cuttings, comprising:
a processing chamber, the processing chamber having
a cuttings inlet through which the wet drill cuttings are received into the processing chamber, an evaporated drilling fluids outlet, a dry drilling solids outlet, a process gas inlet configured to receive process gas, a fixed stage comprising a fixed bed in fluid communication with the process gas inlet and configured to receive the process gas therefrom, an agitator stage upstream of and in fluid communication with the fixed bed and configured to receive the process gas therefrom, the agitator stage operatively connected to the cuttings inlet and having a mixing device configured to agitate the wet drill cuttings received therefrom,
wherein the processor is configured to
provide the process gas to the fixed bed and the agitator stage, thereby heating the fixed bed and agitator stage so as to heat and agitate the wet drill cuttings so that at least a portion of drilling fluid is evaporated therefrom and at least some dry solid drill cuttings remain, provide evaporated drilling fluid to the evaporated drilling fluids outlet for recovery therefrom, and
provide dry solid drill cuttings to the dry solids outlet for recovery therefrom; and
wherein the processor operates at a pressure above atmospheric pressure.

17. A system for removing drilling fluid from wet drill cuttings, comprising:
a combustion chamber having at least one air inlet, at least one fuel inlet and a combustion exhaust outlet, the combustion chamber configured to
receive air via the at least one air inlet,
receive fuel via the at least one fuel inlet from a fuel source, and
heat a mixture of the air and the fuel to a combustion temperature, thereby producing a combustion exhaust for delivery to the combustion exhaust outlet;
a heat transfer device configured to
receive the combustion exhaust from the combustion chamber,
receive non-condensable inert gas, and
transfer heat from the received combustion exhaust to the received non-condensable inert gas, thereby heating the non-condensable inert gas to a first temperature;
a natural gas exhaust generating device;
a processor having a processing chamber, the processor chamber having
at least one cuttings inlet through which the wet drill cuttings are received into the processing chamber, an evaporated drilling fluids outlet, a dry drilling solids outlet, at least one process gas inlet through which at least one of the heated non-condensable inert gas and the natural gas exhaust is received into the processing chamber, a fixed stage comprising a fixed bed in fluid communication with the at least one process gas inlet and configured to receive the process gas therefrom, an agitator stage upstream of and in fluid communication with the fixed bed and configured to receive the process gas therefrom, the agitator stage operatively connected to the at least one cuttings inlet and having a mixing device configured to agitate the wet drill cuttings received therefrom,
wherein the processor is configured to
provide process gas comprising at least one of the heated non-condensable inert gas and the natural gas exhaust to contact and directly heat the wet drill cuttings by convection so that at least a portion of drilling fluid is evaporated therefrom and at least some dry solid drill cuttings remain, provide evaporated drilling fluid to the evaporated drilling fluids outlet for recovery therefrom, and provide dry solid drill cuttings to the dry solids outlet for recovery therefrom; and at least one condensing device having a condenser inlet in fluid communication with the evaporated drilling fluids outlet, the at least one condensing device configured to condense at least a portion of the evaporated drilling fluids received directly or indirectly from the evaporated drilling fluids outlet and to provide condensed drilling fluid to a condenser outlet for recovery therefrom;

wherein the combustion chamber, the heat transfer device, the natural gas exhaust generating device, the processor and the at least one condensing device operate at a pressure above atmospheric pressure;

wherein providing the process gas comprising to contact and directly heat the wet drill cuttings by convection comprises providing the process gas to the agitator stage via the fixed bed and agitating the wet drill cuttings by the mixing device.

18. The system of claim 17, wherein the mixing device is a mechanical mixing device.

19. The system of claim 17, further comprising a purge system downstream the fixed stage and configured to compel at least a portion of the dry solid drill cuttings towards and for receipt by the dry solids outlet.

20. The system of claim 17, wherein the fixed stage comprises a heat distribution system configured to distribute the received process gas across at least one heat distribution plane of the agitator stage.

* * * * *